Jan. 17, 1939.   H. LEDWINKA   2,143,889
POWER VEHICLE
Filed Nov. 26, 1934   3 Sheets-Sheet 1
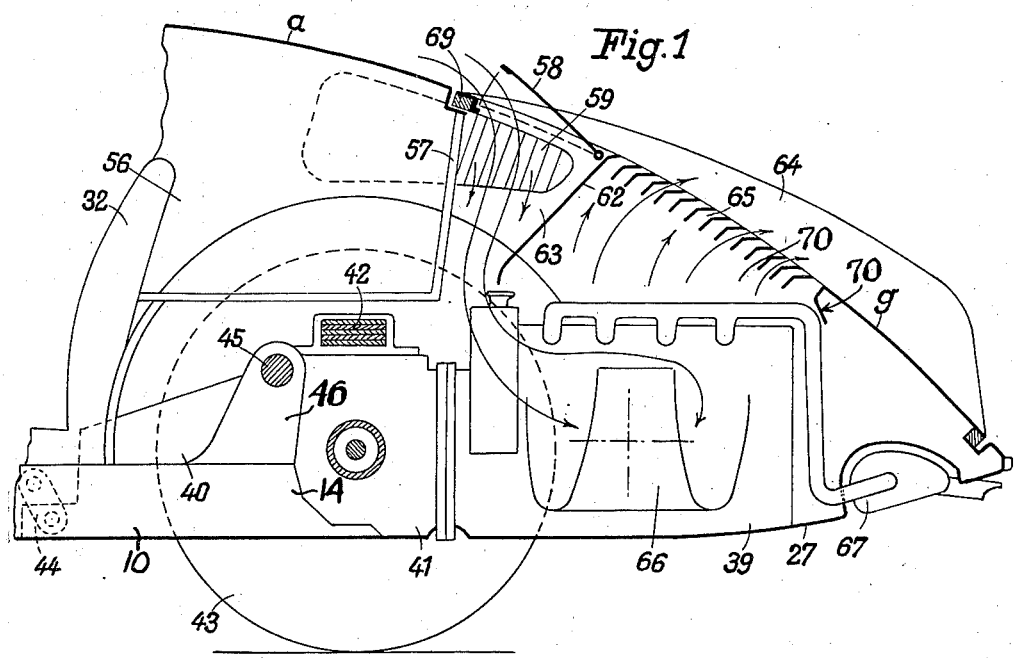
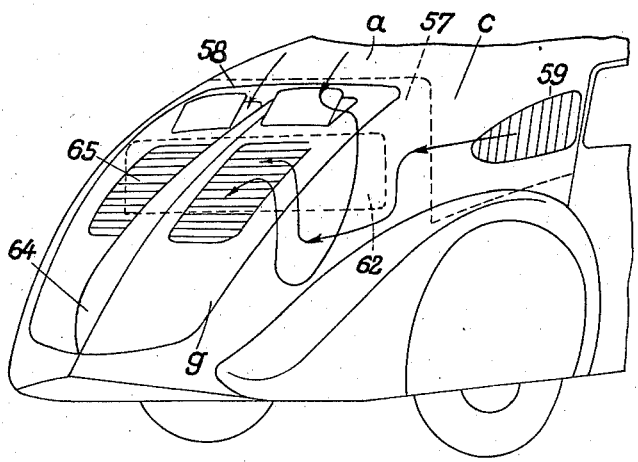
Inventor:
HANS LEDWINKA.
By
ATTORNEYS Jan. 17, 1939.   H. LEDWINKA   2,143,889
POWER VEHICLE
Filed Nov. 26, 1934   3 Sheets-Sheet 2
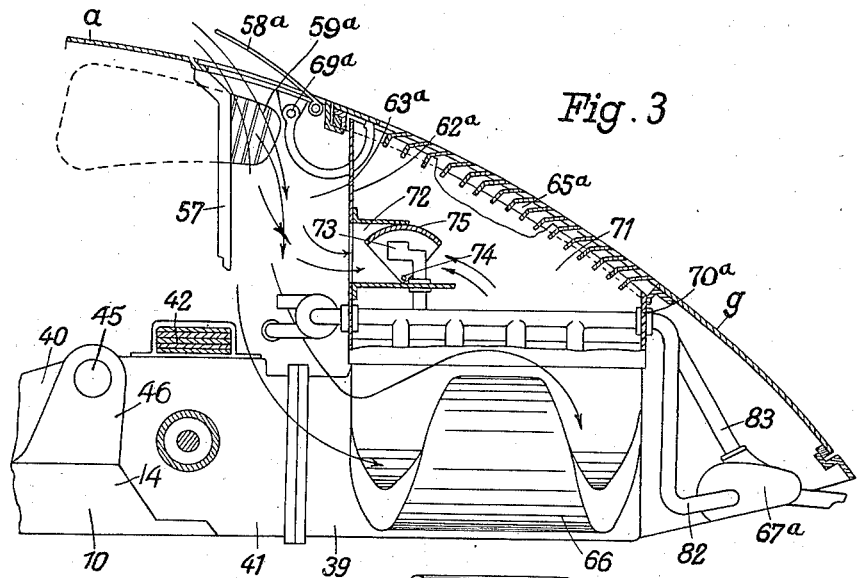
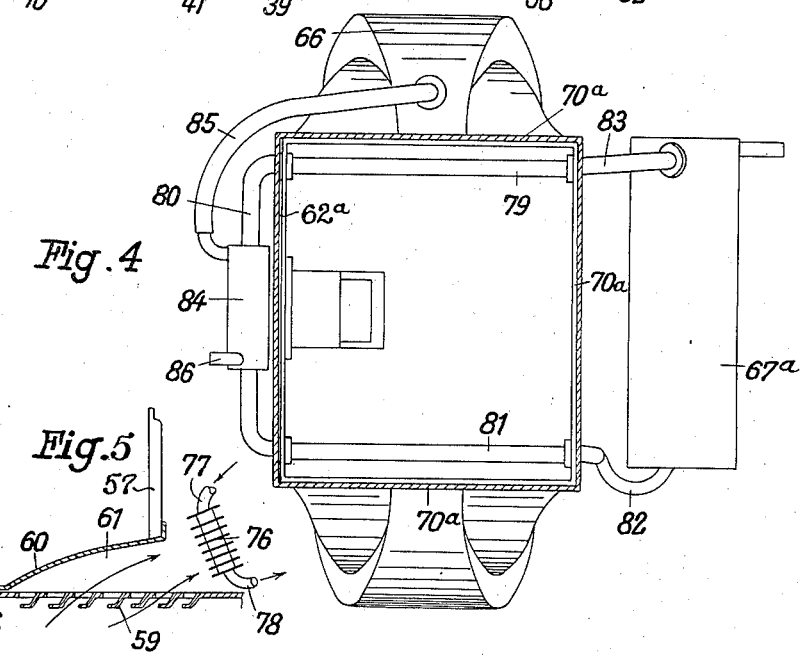
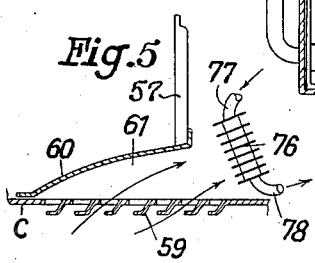
Inventor:
HANS LEDWINKA.
By
ATTORNEYS Jan. 17, 1939.   H. LEDWINKA   2,143,889
POWER VEHICLE
Filed Nov. 26, 1934   3 Sheets-Sheet 3
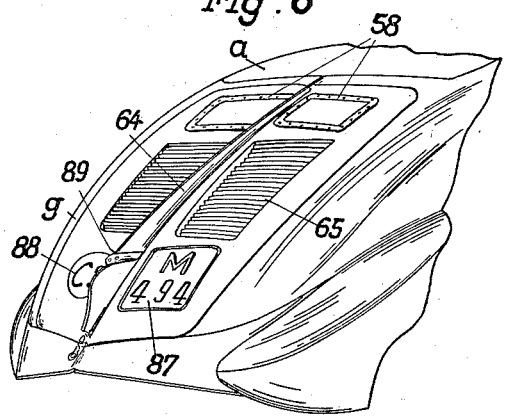
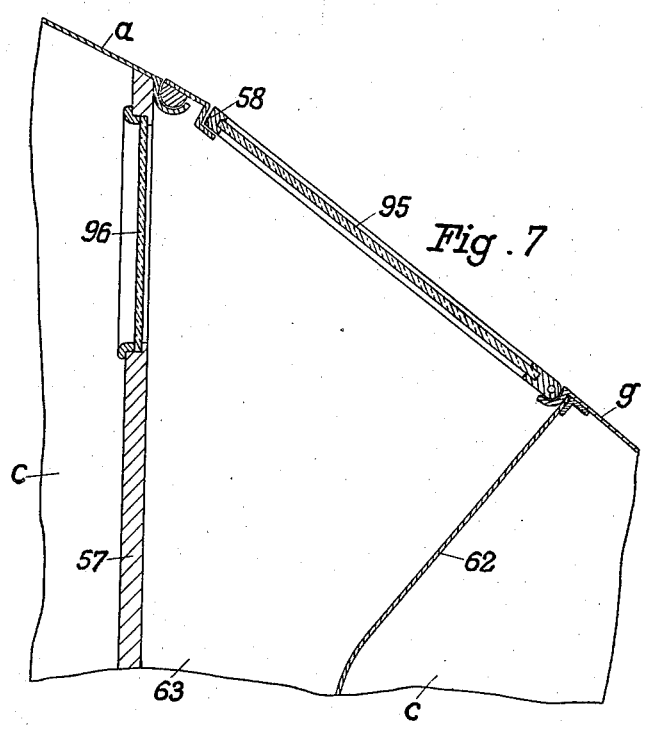
Inventor:
HANS LEDWINKA.
By
ATTORNEYS Patented Jan. 17, 1939

2,143,889

UNITED STATES PATENT OFFICE 2,143,889

POWER VEHICLE

Hans Ledwinka, Koprivnice, Czechoslovakia

Application November 26, 1934, Serial No. 754,758
In Germany January 16, 1933

6 Claims. (Cl. 180—54)

This invention relates to a power vehicle which, owing to the shape of its external surfaces, to the construction of the frame or chassis as well as to the construction and arrangement of the engine, offers a minimum of air resistance, possesses particularly good driving qualities and is, at the same time, relatively cheap and simple to manufacture and has a roomy interior and great durability.

According to the invention, a closed power vehicle is provided in which the engine is arranged in an engine compartment at the rearward end of the vehicle, the form of which is of so-called air-foil or streamlined construction so as to offer a minimum of resistance to the air.

Any difficulties in cooling which may arise owing to the engine being fitted in the rear part of the vehicle are overcome, in accordance with the invention, by providing inlet openings for the cooling air both in the two side walls as well as in the rear part of the top wall of the vehicle body.

The current of air which is conducted away by the upper side of the vehicle body which slopes downwardly towards the rear with, in some cases, the air which is drawn-in from the sides, is conducted after sweeping over the parts to be cooled, to the atmosphere through outlets situated on the upper side of the vehicle closely behind the air inlet openings. Thus these outlets are situated at a place where, owing to the previous deflection of the air and the reduction in the cross-section of the vehicle, there is a powerful draught or suction which assists the work of the fans. The outlet to the atmosphere may, however, also take place at another place where there is a powerful draught or suction owing to the aerodynamic conditions. The outlet of the air to the atmosphere at a place where there is a strong draught or suction not only results, as stated, in the work of the fans being lightened, but also reduces the air resistance, since the suction at this place which checks the speed of the vehicle is considerably reduced.

Further features of the invention which are concerned in particular with obtaining a free view to the rear in a streamlined vehicle in which the engine is arranged at the rear without interfering with the flow of air, will be clear from the constructional examples which are hereinafter described and illustrated in detail in the accompanying drawings.

In the drawings,

Figure 1 is a vertical longitudinal section through the rear part of the vehicle showing the arrangement of the engine;

Figure 2 is a perspective view of the rear part of the vehicle seen obliquely from behind, in which the direction of flow of the cooling air is indicated;

Figure 3 is a view similar to Figure 1 showing a slightly modified arrangement for conducting the cooling air to the engine;

Figure 4 is a plan view of the engine corresponding to Figure 3, the adjacent parts of the walls and of the engine being omitted;

Figure 5 is a fragmentary horizontal section through the structure in the upper part of Figure 3;

Figure 6 is a perspective view of the rear part of another modified form of vehicle showing the rear vision windows in the top wall through which the operator may look rearwardly; and Figure 7 is a section through the device for looking to the rear in a vehicle shown in Figure 6.

Referring to the drawings, the body of the vehicle is of the so-called air-foil or streamlined form and has the shape of the section of an aeroplane wing.

In the new construction the engine is fitted in the rear part of the vehicle and access to it is obtained by means of a removable or hinged cover g and it can drive directly on to the rear axle and wheels. The cover g then forms the rear downwardly sloping section of the upper wall of the body of the vehicle.

The driving unit, which consists of the engine 39, the change speed gear 40, the driving gear 41 and springs 42 arranged between them and the other parts for supporting and driving the wheels 43, is attached on the one hand to strengthening members provided at the point of the fork of the bifurcated central supporting member 10, preferably with the interposition of straps 44, and on the other hand by means of the ends of a cross member 45 to bearing brackets 46 connected to the arms 14 of the fork. The frame or chassis is thus as it were suspended from the underside of the driving unit.

There is a space 56 in the inside of the body of the vehicle behind the back seats 32 and above the part of the driving unit which comprises the change speed gear 40 and the driving gear 41. This space 56 can be shut off by means of covers or doors (not illustrated) arranged directly behind the back of the back seat 32 and may be used primarily for taking luggage.

The actual engine room begins behind the back wall 57 of the space 56. In the parts of the top wall a of the vehicle body which slope obliquely downwards there are arranged air inlet openings which are covered by flaps 58 which open towards the front. Air inlet slots 59 are also provided in the side walls c of the body of the vehicle and these slots may be located in part in front of the rear wall 57 of the space 56. In the latter case there is provided behind the slots situated before the wall 57 an auxiliary wall 60 by which a passage 61, which is shut off from the space 56 and opens into the engine room, is formed. Behind the openings in the top wall which can be closed by the flaps 58 and the openings 59 in the side walls there is a downwardly extending transverse partition 62 which is connected to the top wall a and the side walls c and extends downwardly right up to the engine or close thereto. This partition 62 forms with the wall 57 and the parts of the side walls c an air conducting passage 63.

Air outlet slots 65 are then provided in the top wall behind the wall 62 at both sides of a fin 64 in the top wall.

The air which flows into the passage 63 is conducted past the lower edge of the wall 62 to the blowers 66 and to the suction pipe of the carburetter (not shown) and is driven by the blowers 66 to the parts to be cooled, in particular to the cylinders, and through the openings 65 to the atmosphere. The exhaust manifold 67 is arranged behind the engine unit preferably in a recess in the lower wall 27 which is open to the outside rather than below the upwardly sloping rear section of the lower wall 27.

The entire rear part of the upper wall with the inlet openings which can be closed by the flaps 58 and the outlet openings 65 preferably forms a cover g which may be removable or can turn, for example, about the front edge 69 for the purpose of obtaining access to the engine chamber.

In the example illustrated the engine has two rows of cylinders which are arranged in V-formation. A fan or blower 66 is provided below each row of cylinders so that the current of air which is conducted to them divides into two above the cylinder unit and each part of the current flows to one of the two fans or blowers 66.

With the described arrangements for the supply and removal of air, a satisfactory cooling is always obtained despite the fact that the engine is arranged at the rear of the vehicle. The air which is supplied for cooling and combustion purposes is free from impurities, whereas this is not the case in the known constructions in which the cooling air is drawn in through openings which are comparatively close to the floor. The amount of cooling air which is supplied can be regulated from the driver's seat by adjusting the flaps 58 by means of a suitable mechanism. Owing to the fact that the air is drawn in downwardly to the low inlet openings of the blowers and owing to the following upward movement of the air during which it is simultaneously heated at the cylinders as well as to the final upward conduction of the air, a chimney effect which assists in the conduction of the cooling air is obtained.

The construction according to Figures 3 and 4 differs from that of Figures 1 and 2 in the first place in that the air inlet flap 58a is arranged in the fixed part of the upper wall a and the large rear flap g containing the air outlet opening 65a only begins behind the flaps 58a and is hinged at the point 69a.

Further, there are connected to the back of the partition 62a the partitions 70 (Figure 4) by which a closed shaft 71, leading from the engine to the outlet slots 65a, is formed (Figure 3).

In the partition 62a between the air inlet shaft 63 and the air outlet shaft 71 is provided a connecting passage 72 in which the suction opening of the carburetter, or the carburetter 73 itself, is located. The opening of this connecting passage 72 which leads to the air inlet shaft 63a or the opening leading to the air outlet shaft 71 can be opened or closed, as desired, by means of a member 75 which can be turned about a pivot 74 located beneath it. In cold weather the opening of the carburetter passage 72 leading to the air inlet passage is closed by means of the member 75 and the carburetter is thereby compelled to draw the pre-heated air for combustion from the air outlet shaft 71, whereas, conversely, in hot weather the opening of the carburetter passage 72 leading to the air outlet shaft 71 is closed and the carburetter is thereby caused to draw-in cool unheated air from the suction 63a.

At the place where one of the lateral auxiliary air inlet passages 61 leads into the suction shaft 63 a cooler 76 is provided, as shown in Figure 5, through which the engine oil is conducted by means of a pipe 77, 78.

The exhaust pipe 79 for one of the two rows of cylinders of the engine is connected by a cross pipe 80 arranged in front of the cylinders to the exhaust pipe 81 belonging to the second row of cylinders. The exhaust gases are only conducted from the rear end of the pipe 81 through the pipe 82 to the silencer 67a. The near end of the pipe 79 is closed but an extension 83 is also fitted at this end which with the pipe 82 enables the silencer 67a directly to be carried by the engine independently of the vehicle body.

The connecting pipe 80 passes through a heat exchange apparatus 84. This heat exchange apparatus may consist essentially of a jacket which encloses the pipe 80 and is closed at the ends. Air from one of the blowers 66 is conducted into the interior of this jacket through a pipe 85 and this air, after being heated, is passed through the agency of a pipe 86 into the interior of the vehicle body which is to be warmed.

The downwardly sloping wall g of the streamlined vehicle is provided in the middle with a narrow stabilizing fin 64 which runs in the direction of travel of the vehicle. The number plate 87 and the plate 88 which carries a letter to indicate the country of origin are fitted on one or both sides of the stabilizing fin 64 and illuminated by an illuminating device 89 therein (Figure 6).

In order to obtain an unimpeded backward view when the engine and cooling air passages are arranged in the manner illustrated in Figures 6 and 7, the device for enabling a view to the rear to be obtained, extends, in accordance with the invention, through the air supply shaft 63. In the constructional example illustrated this device comprises a transparent sheet or disc 95 of glass or other suitable material which is inserted in the air inlet flap 58. At substantially the same height as the disc, or discs, 95 one or more openings are provided in the partition 57 which are also filled with sheets or discs 96 of glass or other suitable transparent material. The upper and lower boundary lines of the windows 95 and 96 are preferably situated respectively in approximately horizontal planes, so that a view to the rear is ensured just as in the case of ordinary vehicles in which the rear wall slopes downwards nearly perpendicularly.

Preferably, a single viewing opening which is filled by a single disc 96 is provided in the partition 57 whereas several, preferably two, outer discs 95 are provided one beside the other, if desired one in each flap 58.

Numerous modifications in the constructional examples illustrated are, of course, within the scope of the invention.

I claim:

1. A vehicle having a power unit arranged rearwardly, a closed body the walls of which extend rearwardly forming thereby a compartment for the power unit, inlets and outlets for the cooling air, the inlets for the air being provided in the top wall of the body in the front part of the power unit compartment, an air passage leading from the air inlets provided in the top of the body down to the power unit, the rear wall of said passage being constituted by a partition extending from the top wall of the body downward close to the driving unit.

2. A vehicle having a power unit arranged rearwardly, a closed body the walls of which extend rearwardly forming thereby a compartment for the power unit, inlets and outlets for the cooling air, the inlets for the air being provided in the top wall of the body in the front part of the power unit compartment, an air passage leading from the air inlets provided in the top of the body down to the power unit, the front wall of the passage being formed by a transverse partition which forms simultaneously the rear wall of an interior of the body and the rear wall of said passage being constituted by a partition extending from the top wall of the body downward close to the driving unit.

3. A vehicle having a power unit arranged rearwardly, a closed body the walls of which extend rearwardly forming thereby a compartment for the power unit, inlets and outlets for the cooling air, the inlets for the air being provided in the top wall of the body in the front part of the power unit compartment, an air passage leading from the air inlets provided in the top of the body down to the power unit, and means for drawing the air for combustion either from said passage or from the outflowing cooling air.

4. A vehicle having a power unit arranged rearwardly, a closed body the walls of which extend rearwardly forming thereby a compartment for the power unit, inlets and outlets for the cooling air, the inlets for the air being provided in the top wall of the body in the front part of the power unit compartment, an air passage leading from the air inlets provided in the top of the body down to the power unit and a further passage leading from the power unit upwardly to the air outlets, a bypath connecting said inlet and outlet passages in which the inlet for the combustion air is located, and means for connecting said latter passage with either the inlet passage or with the outlet passage.

5. In a motor driven vehicle, the combination comprising a body having a substantially horizontal bottom wall and a top wall converging therewith and gradually sloping toward the rear in air foil fashion, side walls connected with said bottom wall and said top wall to define an engine compartment in the rear end of the body, an internal combustion engine mounted in said compartment near said bottom wall, a transverse partition in said compartment adjoining said top wall and said side walls and extending downwardly toward said engine, an air inlet being provided in said top wall in front of said partition and an air outlet being provided in said top wall in the rear of said partition, whereby cooling air entering said inlet will be conducted by said partition downwardly toward said engine and from said engine upwardly to said outlet.

6. In a motor driven vehicle, the combination comprising a body having a substantially horizontal bottom wall and a top wall converging therewith and gradually sloping toward the rear in air foil fashion, side walls connected with said bottom wall and said top wall to define an engine compartment in the rear end of the body, an internal combustion engine mounted in said compartment near said bottom wall, two transverse partitions in said body adjoining said top wall and said side walls to define an air passage, an air inlet being provided in said top wall between said partitions, and windows in at least one of said partitions and in said top wall through which a view to the rear of the vehicle through said passage may be obtained.

HANS LEDWINKA.